United States Patent
Mockenhaupt

(10) Patent No.: US 8,502,545 B2
(45) Date of Patent: Aug. 6, 2013

(54) APPARATUS AND METHOD FOR REACTIVE POWER COMPENSATION OF A TEST TRANSFORMER

(75) Inventor: Jan-Rainer Mockenhaupt, Fuerth-Burgfarrnbach (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 13/125,129

(22) PCT Filed: Oct. 20, 2008

(86) PCT No.: PCT/EP2008/008986
§ 371 (c)(1),
(2), (4) Date: Apr. 20, 2011

(87) PCT Pub. No.: WO2010/045959
PCT Pub. Date: Apr. 29, 2010

(65) Prior Publication Data
US 2011/0204901 A1      Aug. 25, 2011

(51) Int. Cl.
*G01R 35/00*     (2006.01)
(52) U.S. Cl.
USPC ....................................................... 324/601
(58) Field of Classification Search
USPC ........ 324/601, 762.01–762.1, 750.01–750.3; 257/48; 438/14–18
See application file for complete search history.

(56) References Cited

U.S. PATENT DOCUMENTS

| | | | |
|---|---|---|---|
| 5,463,285 A * | 10/1995 | El-Hamamsy | 315/248 |
| 5,625,277 A | 4/1997 | Khan et al. | |
| 5,670,881 A * | 9/1997 | Arakawa et al. | 324/322 |
| 2009/0218993 A1 | 9/2009 | Berggren et al. | |

FOREIGN PATENT DOCUMENTS

| | | |
|---|---|---|
| DE | 3622570 A1 | 1/1988 |
| WO | 9624188 A1 | 8/1996 |
| WO | 2007111541 A1 | 10/2007 |

* cited by examiner

*Primary Examiner* — Tung X Nguyen
(74) *Attorney, Agent, or Firm* — Laurence A. Greenberg; Werner H. Stemer; Ralph E. Locher

(57) ABSTRACT

An apparatus and a method for reactive power compensation of a test transformer with an inductor and a stepped capacitor bank and a generator. The generator is used for generating a generator current and a generator voltage with a predeterminable test frequency. The inductance of the inductor can be set and can be interconnected with a stepped capacitor bank in such a way that the generator can be operated on virtually exclusive active power. Within the test circuit, the generator is therefore almost always set at an optimum operating point for testing of the test transformer and does not need to be dimensioned to be any larger than required. As a result, the power of the generator can be used in optimum fashion for generating the generator voltage and, as a result of the reduction in the component part sizes which is carried out on the essential components in the test circuit, enables the mobile use of the entire apparatus for in-situ testing of the power transformer to be tested.

10 Claims, 3 Drawing Sheets

APPARATUS AND METHOD FOR REACTIVE POWER COMPENSATION OF A TEST TRANSFORMER

BACKGROUND OF THE INVENTION

Field of the Invention

The invention relates to an apparatus and method for power factor correction for a test transformer by means of an inductor and a generator, wherein the generator is used to produce a generator current and a generator voltage at a predeterminable test frequency.

Power transformers are developed and produced for each individual application because of the respectively required power specifications from electricity supplies and line system operators. During the course of the development and production process, the power transformers have to comply with specific performance requirements, which are checked and verified by means of so-called test facilities. At the end of the production process, the performance features of the power transformer, as a test transformer, are checked in a stationary test facility. During the process, for example, the withstand voltage is tested by carrying out an induced power-frequency recovery voltage test.

The test facility must be able to test the test transformer over a wide electrical power range, on the basis of national and international regulations and standards. The test facilities are therefore designed such that, as far as possible, the test transformer to be tested can be tested within the test facility.

In addition to the physical requirements for a test facility, the test facility also has to provide specific electrical power ranges for testing test transformers at different test frequencies and different test voltages. The choice of the test frequencies and test voltages must in this case comply with the international and national standards. The test frequency and test voltage influence the entire test circuit and the design of the components. The electrical behavior of the test transformer is highly inductive at a test voltage at a low frequency. In contrast, the behavior of the test transformer in the test circuit is highly capacitive when the test voltage frequency is high. One problem in this case is that, in the event of a inequality measure between specific components in the test circuit with a test transformer, for example the ground for active iron in the transformer cores and the generator relative to the ground of the copper in the electrical circuit, very high capacitive or inductive disturbance components can occur during the course of the test, and can even prevent a test from being carried out when there is an excessive inequality ratio between specific components of the test transformer.

Traditionally, this problem is overcome by using very large motor/generator machine sets to produce the required generator voltage or generator current at a predeterminable test frequency. In order to apply the required real power and reactive power, for the required power range, these motor/generator machine sets are very large, and therefore cannot be used in a mobile form.

Furthermore, permanently installed test facilities are known having medium-size transformers and large inductors and capacitors which can be switched only at zero voltage. In this case, the power factor correction is connected and disconnected in an unregulated form and, before every change in the switching level, requires that the motor/generator machine set be powered down, or that the compensation device be electrically disconnected. This method is time-consuming and mechanically, electrically and thermally loads the motor and generator machine sets.

Particularly against the background of the requirements of the power supply companies and the national supervisory authorities for "in situ" testing of the power transformers which are in operation, it is impossible to use the previous large motor/generator machine sets. As an alternative, it would be possible to individually calculate the inductance and capacitance of the test transformer in the respective overall test circuit, and then to provide the appropriate capacitances and/or inductances. This would have to be done individually, at defined test voltages and test frequencies, for each test situation. This process is highly complex and cannot be used for test transformers whose performance data, which is determined specifically during the production process, is not available.

By way of example, DE 40 07 826 C2 describes a method for operation of a power factor regulator which connects and disconnects capacitor steps in a stepped capacitor bank, by means of a current transformer in a network to be compensated, as a function of determined capacitance values within the network to be compensated.

Furthermore, DE 101 37 615 A1 describes a method for power factor correction, in which the reactive energy is detected via a reactive energy difference regulator, on the basis of the instantaneous network voltage and the network currents in the system to be compensated, and a mean reactive power requirement is determined, and is provided for compensation, as a function of possibly determined undercompensation or overcompensation for the reactive work.

DE 36 22 570 A1 likewise describes a control unit of AC voltage test systems, consisting of a control transformer and a compensation induction coil. A voltage test can be carried out over the entire voltage range of the test transformer by means of an additional capacitive test system, by a suitable design of the control transformer and of the inductor, by means of the control unit.

Furthermore, U.S. Pat. No. 5,281,908 describes a mobile test facility with variable capacitances, in which the capacitances can be varied incrementally by means of the test facility, depending on the measured values of the test circuit or test transformer.

All the solutions in the prior art are subject to the problem that direct "on-site" testing of the power transformer over a wide voltage and frequency range is currently impossible using known systems.

BRIEF SUMMARY OF THE INVENTION

The object of present invention is therefore to provide an apparatus and a method for power factor correction for a test transformer, in which the apparatus can be installed easily and in the immediate vicinity of a power transformer as a test transformer, and an "on-site" test can be carried out quickly and easily.

With regard to the apparatus for power factor correction for a test transformer, the object is achieved according to the claimed device features.

With regard to the method for power factor correction for a test transformer, the object is likewise achieved according to method claims.

The invention provides that the inductance of the inductor is variable and can be connected to a stepped capacitor bank, wherein the variable inductors and the stepped capacitor bank are arranged between the generator and the test transformer and can be connected to the test transformer on the basis of determined electrical variables of a test circuit such that the generator can be operated virtually exclusively with real power. Since the generator can be operated virtually exclusively with real power, this ensures an optimum operating point for a test of the test transformer within the test circuit. This makes it possible to keep the power of the generator for producing a generator voltage or a generator current at a predeterminable test frequency, the inductor and the stepped capacitor bank small and, because of the reduction in the component sizes achieved in this way, makes it possible to use the apparatus directly where the power transformer to be tested is installed.

The inductor is advantageously designed such that the core can be adjusted continuously variably within the winding by means of the plunger-type core principle, thus allowing the inductance to be adjusted continuously variably. The stepped capacitor bank allows connection and disconnection of the respective capacitor steps even on load, which means that there is no need to interrupt the test operation in order to change capacitive compensation steps—as required in the prior art.

Advantageously, a phase angle cos ($\Phi$) is determined between the generator voltage and the generator current, and setting variables for the stepped capacitor bank and/or the variable inductors are determined and set from this. The phase angle cos ($\Phi$) between the generator voltage and the generator current is the measure of the extent of the active work within the test circuit. The generator can be operated virtually exclusively with real power by determining the corresponding phase angle cos ($\Phi$) between the generator voltage and the generator current, and by appropriate compensation for this phase angle by the stepped capacitor bank and the variable inductance. When a matching transformer is used for transformation of the generator voltage and of the generator current to the test voltage and the test current for the test transformer, the phase angle cos ($\Phi$) between the test voltage and the test current can alternatively or additionally be determined immediately upstream of the test transformer—taking account of the entire test circuit—and can be used to determine the power factor correction required in the test circuit.

Advantageously, a control determines and sets the setting variables of the stepped capacitor bank and/or of the variable inductors as a function of the phase angle cos ($\Phi$) between the generator voltage/generator current and/or between a test voltage/test current immediately before the test transformer, using a predeterminable test frequency, and adjusts the setting variables, determined therefrom, at the stepped capacitor bank and/or the variable inductors.

The motor which is required to drive the generator is advantageously set to the required rotation speed as an equivalent to the test frequency. When the rotation speed is present, the matching transformer is advantageously connected as part of the test circuit, by means of a circuit breaker. The matching transformer is used to transform the generator voltage/generator current produced by the generator to the test voltage/test current that has to be applied to the test transformer. When the motor is at the required rotation speed, the generator excitation is connected at the same time by closing the circuit breaker at the input to the matching transformer, and is slowly run up. During the course of this process of running up the generator, the generator voltage and the generator current, and/or the phase angle between the generator voltage and the generator current, are determined continuously, and set in variables for the variable inductors and the stepped capacitor bank are derived therefrom. In addition, the phase angle between the test voltage and the test current can be determined directly upstream of the test transformer. The motor can advantageously be regulated and set to the required rotation speed as the equivalent to the test frequency, with the circuit breaker closed.

According to the invention, a method is provided for power factor correction for a test transformer by means of an inductor and a capacitor bank and a generator, such that the required rotation speed of the motor is determined as an equivalent to the test frequency, and an appropriate generator can be connected thereto.

The phase angle cos ($\Phi$) which results in the connected test circuit between the generator voltage and the generator current is determined and, based on appropriate measurement variables in the test circuit, the inductance of the variable inductance and/or the capacitance of the stepped capacitor bank are/is set such that the generator is operated virtually exclusively with real power when the test circuit is closed.

Capacitive compensation is advantageously provided for the test transformer in the test circuit such that no capacitance is connected up to a limit value of the phase angle cos ($\Phi$) between the generator current and the generator voltage and/or between a test voltage, determined directly upstream of the test transformer, and a test current. Only when the predeterminable limit value of cos ($\Phi$) is reached are capacitor steps in the stepped capacitor bank connected in steps during the course of increasing the generator voltage, until the predetermined generator voltage or test voltage is reached.

The capacitive compensation is advantageously connected at a power factor of cos ($\Phi$)=0.7. The number of steps in the capacitor bank is not rigidly predetermined but results from the profile of the power factor after the connection of the first and each further step. In this case, the respective power factor is determined as the phase angle cos ($\Phi$) before and after the connection of a capacitor step, and an estimate is made as to whether further capacitor steps need be connected. On reaching a power factor as a phase angle of cos ($\Phi$)≈1 or a capacitive power factor of cos ($\Phi$)≈0.9, no further capacitor steps are connected, but the generator excitation is run up further. The entire process is therefore repeated until the generator voltage or, by means of a matching transformer, the test voltage, is present on the test transformer. If the generator voltage or test voltage has still not been reached after the maximum capacitive compensation power has been connected, the system can increase the excitation further, but up to the maximum stability limit of a phase angle of cos ($\Phi$)≈0.6.

Inductive compensation is advantageously carried out by adjustment of the variable inductor and disconnection of the stepped capacitor bank. Since capacitive compensation is unnecessary if the test circuit has a capacitive behavior—predominantly at frequencies above 80 Hz—this is done completely by the test circuit. In contrast to capacitive compensation, inductive compensation can be regulated continuously variably by means of a variable inductor, in particular based on the plunger-type core principle.

To this extent, after the excitation for the generator has been connected, the power factor is calculated continuously as the phase angle cos ($\Phi$), and a nominal-actual value comparison of the instantaneous and predetermined phase angle cos ($\Phi$) is determined. For the purposes of the regulation process, the variable inductor is controlled such that the inductance is readjusted with respect to the determined reactive power as a function of the phase angle cos ($\Phi$). This is done until the generator voltage or test voltage is reached, or the maximum inductance which can be connected is present in the test circuit. The generator voltage is increased at a rate which is matched to the readjustment of the plunger-type core. This results in continuous regulation of the inductive compensation for the reactive power. If the generator voltage or test voltage is not yet present after connection of the maximum inductance, the excitation can be raised further up to a maximum, however, of a phase angle of cos ($\Phi$)≈0.6. This value should not be undershot, as a stability limit for the system.

Advantageously, within the scope of the method, the setting variables for the variable inductors and/or the stepped capacitor bank are determined from the determined phase angle between the generator voltage/generator current or between the test voltage/test current by means of a programmable logic controller, or are controlled by the programmable logic controller. In order to better determine the electrical states in the test circuit, instrument transformers are arranged in the test circuit, in particular in order to determine the phase angle cos ($\Phi$) between the generator voltage and the generator current, and/or in order to determine the phase angle cos ($\Phi$) between the test voltage and the test current.

BRIEF DESCRIPTION OF THE SEVERAL VIEWS OF THE DRAWING

Further advantageous refinements are specified in the dependent claims. In the figures:

DESCRIPTION OF THE INVENTION

Figure 1:
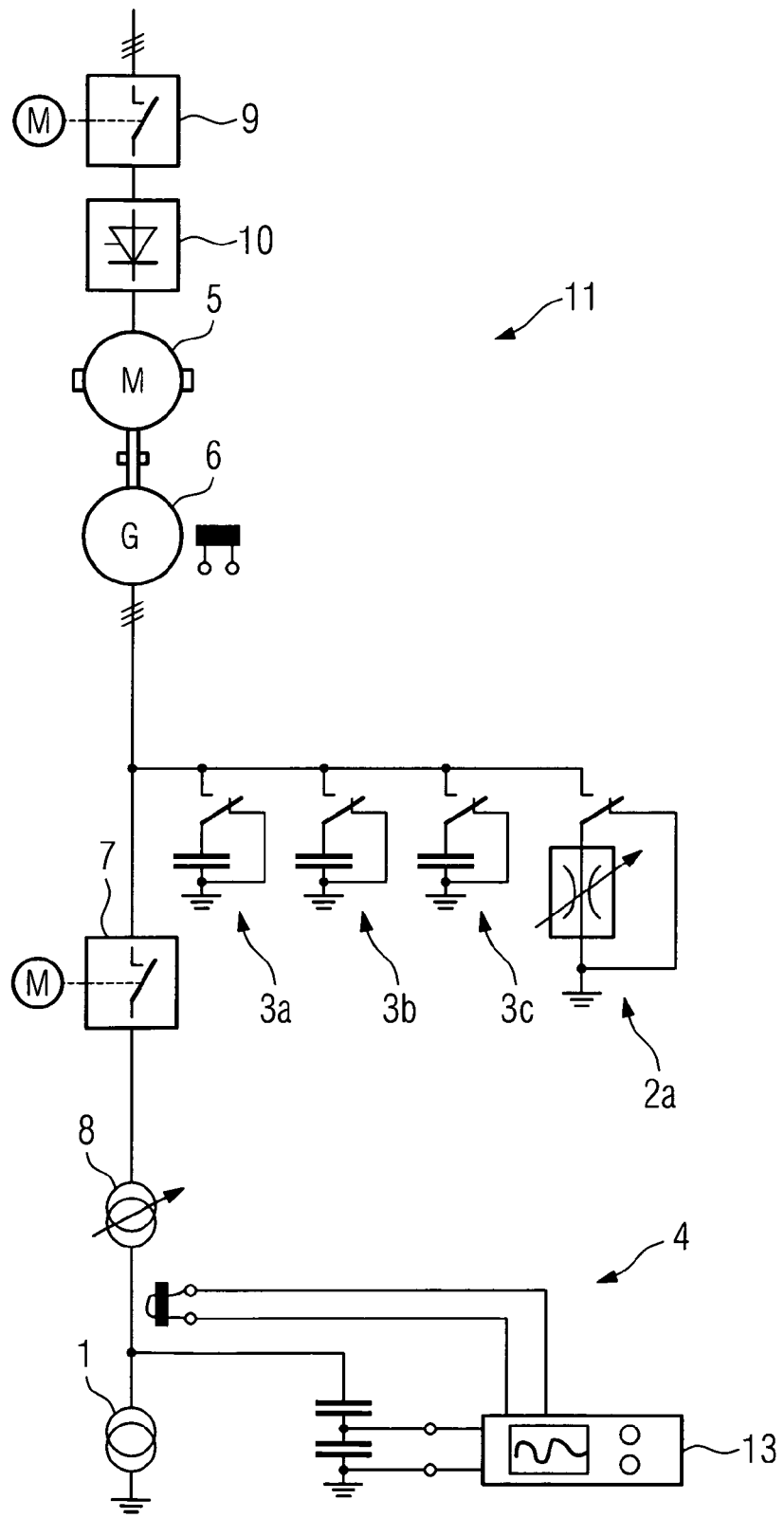
FIG. 1 shows a circuit diagram of the test circuit with three stepped capacitor banks and one variable inductor.

FIG. 1 shows a general circuit diagram of the advantageous apparatus. The test circuit is connected to an external voltage source, for example a 400V, 1500 A AC voltage source, by means of a main switch 9. The three-phase AC voltage is converted to a DC voltage for the motor 5 by means of a converter or frequency converter 10. The motor is used to drive the generator 6, which directly produces the appropriate generator voltage at a predeterminable test frequency, or, if the corresponding generator voltage is not sufficient, this is transformed to the test voltage by means of a matching transformer 8. In the illustrated example in FIG. 1, the variable inductor 2a is connected to three capacitor steps 3a, 3b, 3c within the test circuit 11. When the generator 6 is at the rotation speed, and therefore forms an equivalent to the generator voltage being excited at the test frequency, the switch 7 is closed by means of a circuit breaker 7, and the test circuit 11 is therefore likewise closed. The phase angle cos ($\Phi$) between the test voltage and the test current at the test transformer 1 can then be measured via a specific measurement circuit 4, and can be displayed by means of an evaluation device 13.

Figure 2:
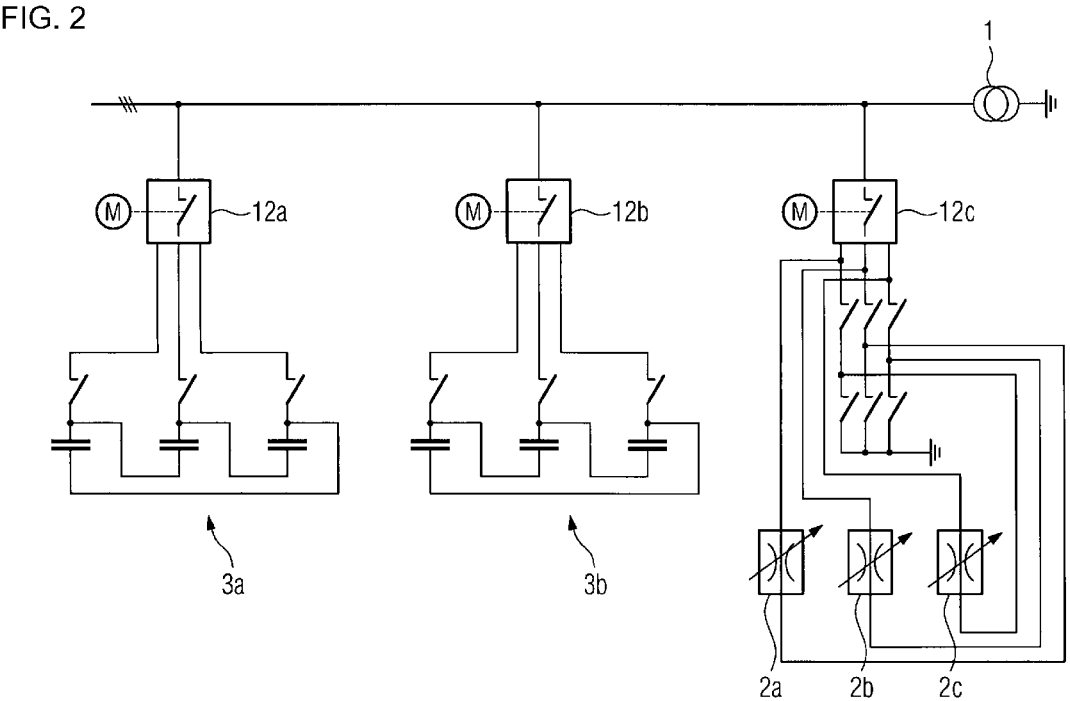
FIG. 2 shows a circuit diagram of a compensation circuit consisting of two stepped capacitor banks and three variable inductors.

FIG. 2 shows a circuit diagram of the compensator circuit with three variable inductors 2a, 2b, 2c and two stepped capacitor banks 3a, 3b. Necessary capacitive or inductive compensation can be provided easily while test operation is continuing as a function of the phase angle cos ($\Phi$) between the generator voltage and the generator current, or between the test voltage and the test current. In this case, inductive compensation is ensured by means of the variable inductors 2a, 2b, 2c, in particular by inductors based on the plunger-type core principle. Depending on the magnitude of the capacitance of the individual capacitor stages in the stepped capacitor bank 3a, 3b, the stepped capacitor bank 3a, 3b can also be used to provide capacitive compensation in incrementally small intervals.

Figure 3:
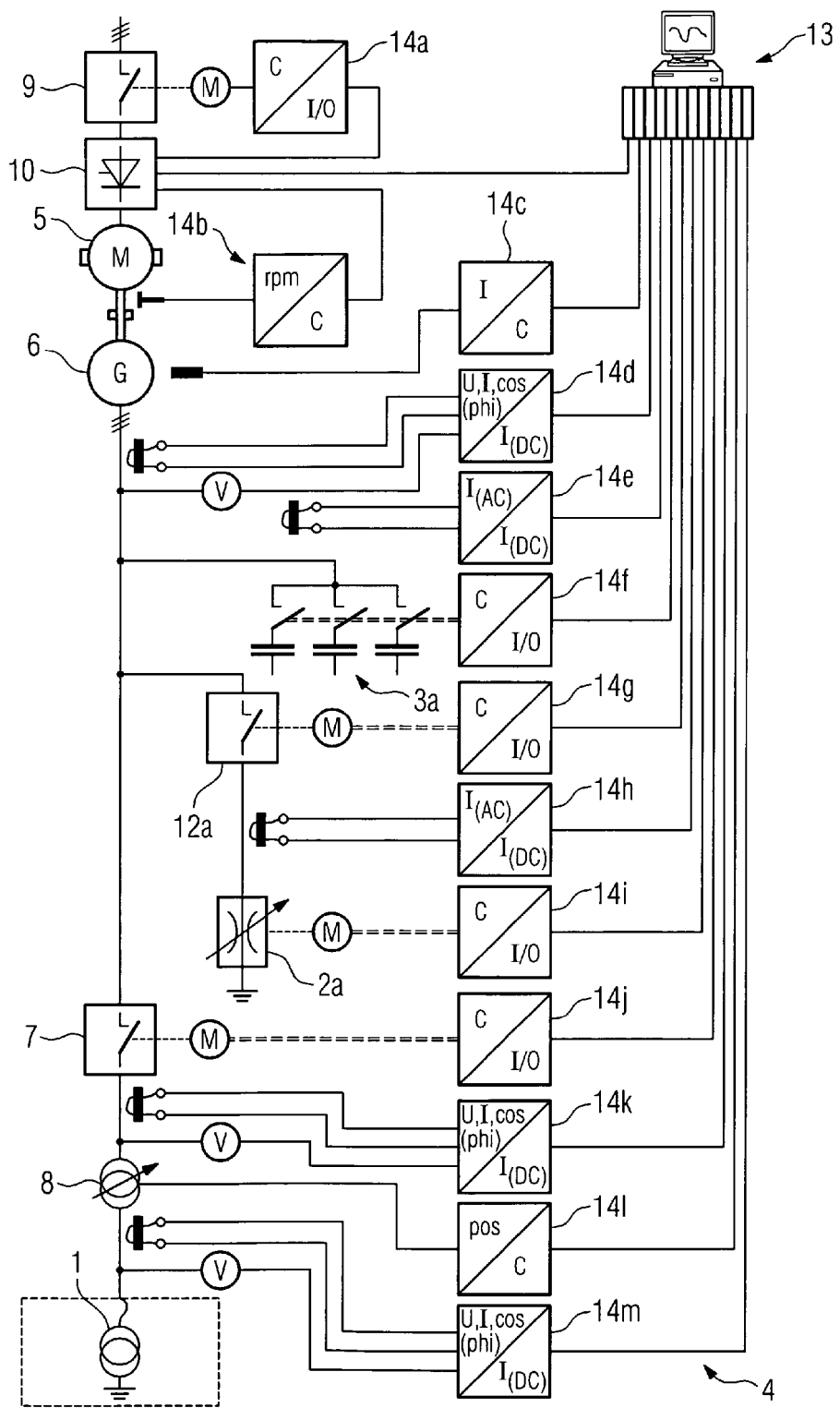
FIG. 3 shows a circuit diagram of the test circuit with instrument transformers and an evaluation unit.

FIG. 3 shows an example of a circuit diagram with measurement sensors, connected to instrument transformers 14a to 14m, arranged at various points in the test circuit 11. An instrument transformer 14m is arranged in particular upstream of the test transformer 1 in order to determine the phase angle between the test voltage and the test current, and an instrument transformer 14k is arranged upstream of the matching transformer 8 in order to determine the generator voltage and the generator current. Furthermore, a measurement sensor with a corresponding instrument transformer 14b is connected directly downstream from the generator 6, and determines the phase angle cos ($\Phi$) between the generator voltage and the generator current in the immediate vicinity of the generator 6 producing this. The measured values obtained by the instrument transformer 14a to 14m are transmitted to an evaluation device 13 and are used by means of a controller (not illustrated) to adjust the setting values of the respective components in the test circuit 11.

The inclusion of inductors 2a, 2b, 2c which can be regulated and of stepped capacitor banks 3a, 3b, 3c using an automated control system allows the generator 6 in the test circuit 11 to be operated close to the real-power operating point of the generator 6 (phase angle cos ($\Phi$)≈1. The use of automatic regulation to optimize the compensation means that the generator 6 has to produce virtually no reactive power. The power and physical size required for the corresponding generator 6 can thus be matched to the actually required real power, and no longer to the reactive power demanded by the entire test circuit 11. The automated compensation for the reactive power results in the capability to use small generators and motor/generator machine sets in comparison to previous systems.

A further advantage of the automatic power factor correction according to the present invention is the arrangement of the compensation elements as variable inductors 2a, 2b, 2c and the stepped capacitor bank 3a, 3b, 3c between the generator 6 and the matching transformer 8. Because of this, the high-voltage side of the test circuit 11 is actually not used for the arrangement of the compensation elements in the form of the variable inductors 2a, 2b, 2c and the stepped capacitor bank 3a, 3b, 3c. The rated voltage of the compensation elements as the variable inductors 2a, 2b, 2c and the stepped capacitor bank 3a, 3b, 3c is therefore identical to the rated voltage of the generator 6, and this contributes to a reduction in the physical size and the rating of all of the components in the test circuit 11. This allows all the components of the test circuit 11 to be physically smaller, in particular the generator 6, the variable inductors 2a, 2b, 2c, the stepped capacitor banks 3a, 3b, 3c and the matching transformer 8.

In this case, the components in the test circuit are of such a size that they can be installed in and moved in standard transport containers. For example, the voltage supply for the test circuit 11, in the form of the main circuit breaker 9, the frequency converter or converter 10, the motor 5 and the generator 6, can be arranged in a first container. The matching transformer 8 can be directly integrated upstream of the transformer 1 to be tested in a second container. The compensation elements in the form of the variable inductors 2a, 2b, 2c and the stepped capacitor bank 3a, 3b, 3c can be arranged in a third container.

Automation of the compensation by means of a programmable logic controller allows the transformer test to be carried out by just one operator. Because safety limits are preset, in particular for phase angles which must not be overshot or undershot, preferably a phase angle of cos ($\Phi$)≈0.6 between the generator voltage and the generator current or between the test voltage and test current, the test transformer 1 can be tested within stable operating states.

LIST OF REFERENCE SYMBOLS

1 Test transformer
2a, 2b, 2c Variable inductor
3a, 3b, 3c Stepped capacitor bank
4 Measurement circuit of the test transformer
5 Motor
6 Generator
7 Circuit breaker for the test circuit
8 Matching transformer
9 Circuit breaker for the apparatus
10 Transformer
11 Test circuit
12a, 12b, 12c Switch
13 Evaluation device
14a to 14m Instrument transformer

The invention claimed is:

1. An apparatus for power factor correction for a test transformer, the apparatus comprising:
    a generator configured to produce a generator current and a generator voltage at a predeterminable test frequency;
    a stepped capacitor bank;
    a variable inductor having a variable inductance and being connectible to said stepped capacitor bank;
    wherein said variable inductor and said stepped capacitor bank are disposed between said generator and the test transformer and are connectible to the test transformer based on electrical variables determined by a test circuit so as to cause said generator to be operated substantially exclusively with real power.

2. The apparatus according to claim 1, which comprises means for determining a phase angle cos between the generator voltage and the generator current, and for determining and setting therefrom setting variables for said stepped capacitor bank and/or the variable inductor.

3. The apparatus according to claim 2, which comprises a control determining and setting the setting variables of the stepped capacitor bank and/or of the variable inductor as a function of the phase angle cos between the generator voltage and the generator current and/or between a test voltage and a test current immediately before the test transformer, using a predeterminable test frequency.

4. The apparatus according to claim 1, which comprises a motor to be set to a required rotation speed as an equivalent to the test frequency and to be connected by way of a circuit breaker, when a rotation speed is present, via the generator to a matching transformer as part of the test circuit.

5. The apparatus according to claim 4, wherein, when the circuit breaker is closed, said generator can be connected and can be set to the required rotation speed as an equivalent to the test frequency.

6. A method for power factor correction for a test transformer by way of an inductor and a generator, wherein the generator is used to produce a generator current and a generator voltage at a predetermined test frequency, the method which comprises the following steps:
    a) determining a required rotation speed of a motor as an equivalent to the test frequency;
    b) connecting a generator to the motor;
    c) determining a phase angle cos between the test voltage at the test transformer and the test current; and
    d) setting an inductance of the variable inductors and of a capacitance of a stepped capacitor bank in dependence on electrical measurement variables determined by a test circuit by way of the test transformer, to thereby cause the generator to be operated virtually exclusively with real power when the test circuit is closed.

7. The method according to claim 6, which comprises:
    providing capacitive compensation for the test transformer in the test circuit such that no capacitance is connected up to a limit value of the phase angle cos between the generator voltage/generator current and/or between a test voltage/test current that is determined immediately upstream of the test transformer; and
    connecting capacitor steps of the stepped capacitor bank only when the predeterminable limit value is reached, and connecting the stepped capacitor bank step-by-step when the generator voltage increases, up to a predetermined test voltage.

8. The method according to claim 6, which comprises carrying out inductive compensation by adjusting the variable inductors while the stepped capacitor bank is disconnected.

9. The method according to claim 6, which comprises determining with a programmable logic controller the setting variables for the inductors and/or the stepped capacitor bank from the determined phase angle cos of the generator voltage and of the generator current, or from the determined phase angle cos between the test voltage and the test current.

10. The method according to claim 6, which comprises determining the phase angle cos between the generator voltage and the generator current, or the phase angle cos between the test voltage and the test current, by instrument transformers connected in the test circuit.

* * * * *